United States Patent [19]
Ogasawara

[11] 4,080,977
[45] Mar. 28, 1978

[54] GOVERNOR VALVE

[75] Inventor: Tsunehiko Ogasawara, Kariya, Japan

[73] Assignee: Aisin Seiki Kabushiki Kaisha, Japan

[21] Appl. No.: 722,763

[22] Filed: Sep. 13, 1976

[30] Foreign Application Priority Data

Sep. 29, 1975 Japan .................................. 50-117400

[51] Int. Cl.² .......................................... G05D 13/14
[52] U.S. Cl. .................................................... 137/56
[58] Field of Search ................. 73/535; 137/53, 56, 137/54, 58

[56] References Cited
U.S. PATENT DOCUMENTS

| | | | |
|---|---|---|---|
| 2,657,699 | 11/1953 | Barrett | 137/53 |
| 2,762,384 | 9/1956 | Rosenberger | 137/56 X |
| 2,962,037 | 11/1960 | Simon | 137/53 |
| 3,302,659 | 2/1967 | Platz | 137/54 |

FOREIGN PATENT DOCUMENTS 648,086  9/1962  Canada .................................. 137/53

*Primary Examiner*—Robert G. Nilson
*Attorney, Agent, or Firm*—Oblon, Fisher, Spivak, McClelland & Maier

[57] ABSTRACT

A governor valve comprising a housing provided with inlet and outlet ports; a rotational shaft provided within the housing; a body rotatably supported by the housing and operatively connected to the rotational shaft; a valve spool slidably disposed within the body for controlling the communication between the inlet and outlet ports; a ball cage slidably disposed within the body and being provided with a plurality of cylindrical portions radially and outwardly extended therefrom; a plurality of ball members slidably inserted into the plurality of cylindrical portions of the ball cage; and a cam member provided with a tapered face for receiving a centrifugal force of the plurality of ball members.

4 Claims, 5 Drawing Figures

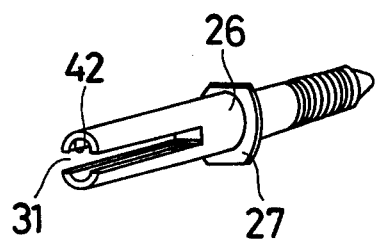
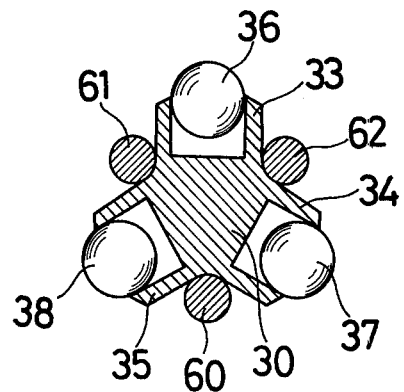
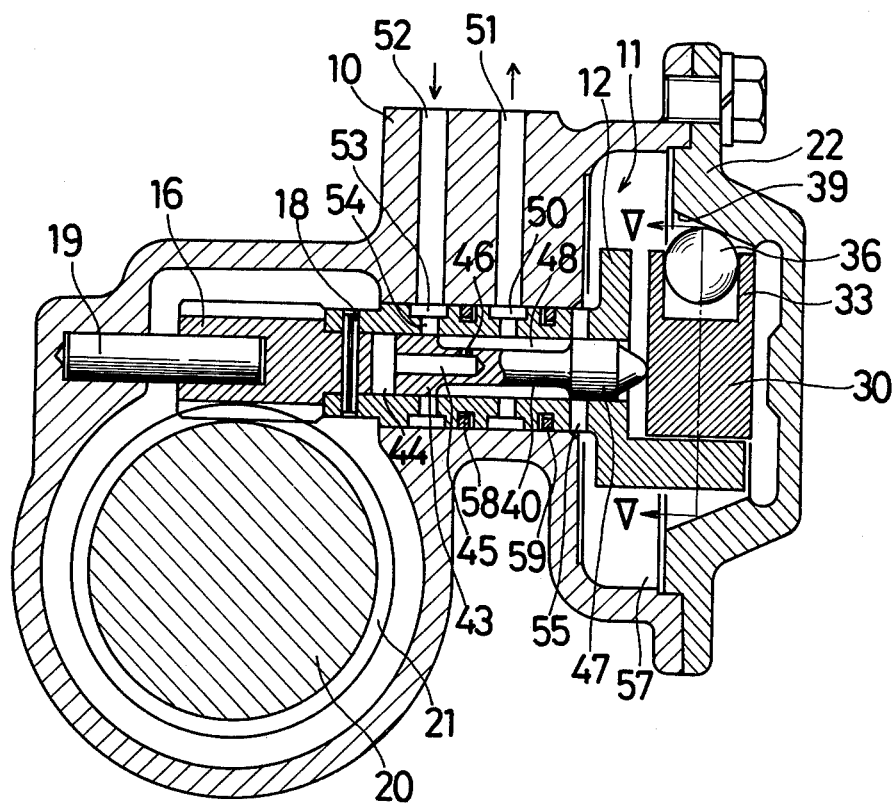

GOVERNOR VALVE

BACKGROUND OF THE INVENTION

1. Field of the Invention

The present invention relates generally to a governor valve, and more particularly to a governor valve having means for obtaining a fluid pressure according to the degree of rotation of a rotational shaft.

2. Description of the Prior Art

In most conventional governor valves, a body is fixedly mounted on a rotational shaft and a fly-weight valve is disposed within the body. However, the measuring accuracy and the weight accuracy of the fly-weight valve are so respectively required that it becomes expensive and considerable difficulty is recognized upon changing the relationship between the amount of rotation of the rotational shaft and the output fluid pressure.

In order to easily change the relationship between the rotation of the rotational shaft and the output fluid pressure by exchanging gears, the body of the governor valve is rotatably mounted on a fixed housing, and in order to lower the cost, the fly-weight and the valve are separately constructed.

Therefore, the fly-weight is a specific shape in a conventional governor valve, so that the best way for changing the relationship between the rotational number of the rotational shaft and the output fluid pressure is by exchanging the gear. However, the gears are not so low priced.

SUMMARY OF THE INVENTION

The object of the present invention, therefore, is to provide an improved governor valve capable of obviating the above-mentioned conventional drawbacks.

Another object of the present invention is to provide a unique and highly simplified governor valve.

BRIEF DESCRIPTION OF THE DRAWINGS

Other objects and advantages of the invention will be more fully appreciated as the same becomes better understood from the following detailed description thereof when considered in connection with the accompanying drawings in which:

FIG. 3 is a perspective view of a pin means of the governor valve shown in FIG. 1;

FIG. 4 is a similar view to FIG. 1, however, showing another embodiment of a governor valve; and FIG. 5 is a similar view to FIG. 2, however, being taken along the line V—V of FIG. 4.

DETAILED DESCRIPTION OF THE PREFERRED EMBODIMENTS

Figure 1:
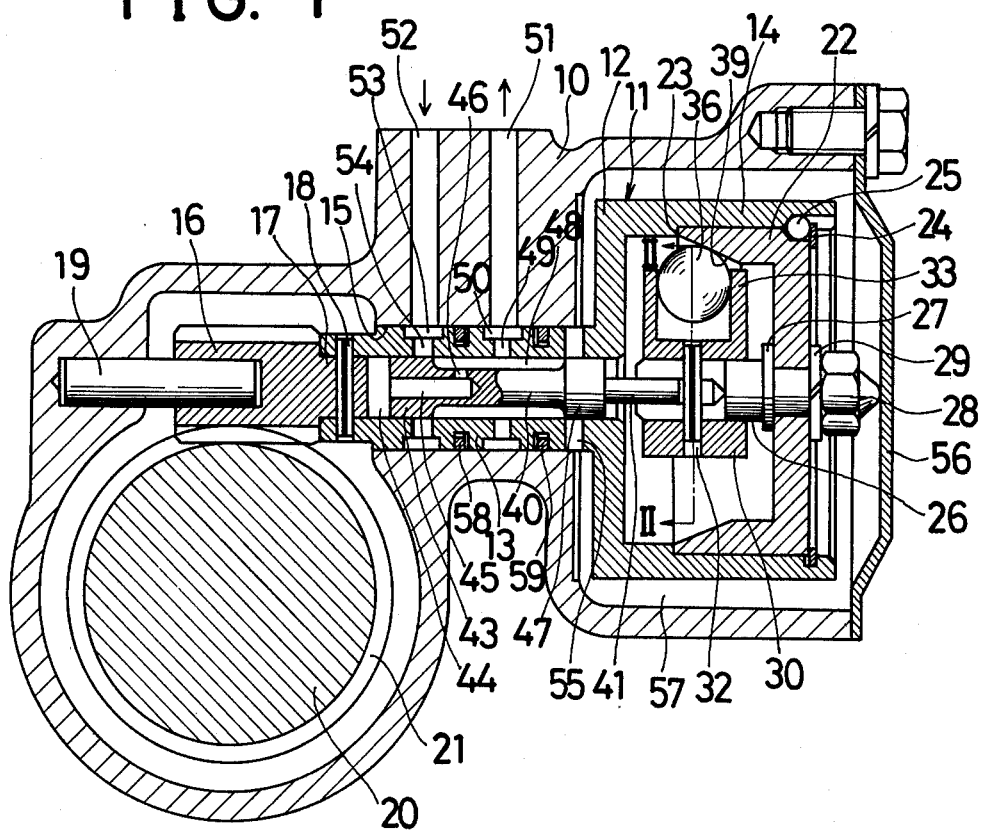
FIG. 1 is a sectional view fragmentarily showing a governor valve.

Referring now to the drawings, and more particularly to FIG. 1, the reference numeral 10 designates a housing in which a governor valve 11 is disposed.

The governor valve 11 comprises a body 12 which is provided with a small diameter land 13 and a large diameter land 14. The small diameter land 13 is rotatably inserted into a bore 15 of the housing 10 and a projection 17 of a worm or a driven gear 16 is fixedly inserted axially therewithin. The worm gear 16 and the body 12 of the governor valve 11 are integrally connected by a spring pin 18 fixedly inserted into the small diameter land 13 of the governor valve 11 and the projection 17 of the worm gear 16. The worm gear 16 is rotatably mounted on a pin 19 which is fixedly provided in the housing 10 and is meshed with a drive gear 21 formed on a rotational shaft 20. The body 12 of the governor valve 11 is thus operatively connected to the rotational shaft 20.

Figure 2:
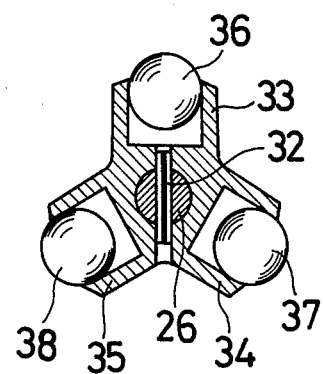
FIG. 2 is a sectional view, however, taken along the line II—II of FIG. 1.

A cam 22 fixedly attached within the end of the large diameter land 14 of the body 12 on the end opposite the small diameter land 13 is axially obstructed by a stepped portion 23 of the large diameter land 14 and a snap ring 24 fixedly provided in an inner peripheral surface of the large diameter land 14 and the rotation of the cam 22 relative to the body 12 is also obstructed by a ball 25 fixedly inserted into an axial groove formed on an outer peripheral surface of the cam 22 and into an axial groove formed on the inner peripheral surface of the large diameter land 14. The cam 22 is of a cylindrical-shape and a pin 26 is fixed thereto by means of a flange 27 shaped thereon, a nut 28 screwed to the pin 26 and a spring washer 29, as clearly viewed from FIG. 3. A ball cage 30 is slidably provided on an outside of the pin 26. The relative rotation between the ball cage 30 and the pin 26 is stopped by a spring pin 32 fixedly inserted into an axis 31 of the pin 26. The ball cage 30 is provided with tubular cylindrical portions 33,34,35, as shown in FIG. 2, in which balls, 36,37,38 are slidably disposed. These balls 36,37,38 are contacted with an inner tapered face 39 of the cam 22.

A projection 41 of a valve spool 40 slidably provided within the small diameter land 13 of the body 12 is slidably inserted into an axial hole 42 of the pin 26 and is also contacted with the spring pin 32. A chamber 44 formed at the left-hand side of a land 43 of the valve spool 40 is fluidically communicated with an annular groove 48 between the land 43 and a land 47 of the valve spool 40 via an axial hole 45 and a radial hole 46 formed in the valve spool 40. The annular groove 48 is always communicated with a radial hole 49 formed in the small diameter land 13 of the body 12. The hole 49 is fluidically communicated with an annular groove 50 of the small diameter land 13 which is always communicated with an outlet port 51 formed in the housing 10. An inlet port 52 formed in the housing 10 is always communicated with an annular groove 53 shaped on the outer periphery of the small diameter land 13 of the body 12. The communication between a radial hole 54 fluidically communicated with the annular groove 53 and the annular groove 48 is attained or interrupted by the land 43 of the valve spool 40. The communication between a radial hole 55 formed in the small diameter land 13 of the body 12 and the annular groove 48 is attained or interrupted by the land 47 of the valve spool 40. The radial hole 55 is fluidically communicated with a chamber 57 formed by the housing 10 and a cover 56 fixed to the body 12 and the housing 10. The cover 56 is contacted with the pin 26 and the pin 19 is contacted with the worm gear 16 to thereby prevent axial movement of the governor valve 11. Seals 58,59 are fixedly attached to the outer periphery of the small diameter land 13 of the body.

A predetermined fluid pressure is supplied from a source of fluid pressure, not shown, to the inlet port 52 and the inlet port 52 is fluidically communicated with a fluid pressure device, not shown, and the chamber 57 is also fluidically communicated with a reservoir, not shown.

The operation of FIG. 1 is described hereinbelow in detail.

When the rotational shaft 20 is rotated, the governor valve 11 is rotated at a corresponding number of rotations with the number of rotations of the rotational shaft 20 by meshing operation of the driven gear 16 and the drive gear 21. The centrifugal force is acted on the balls 36,37,38 by the rotation of the governor valve 11 and the balls 36,37,38 are pressed against the tapered face 39 of the cam 22 by such centrifugal force. The axial component of the centrifugal force acting on the balls 36,37,38 is generated by contacting the balls 36,37,38 with the tapered face 39 of the cam 22 and is transmitted from the balls 36,37,38 to the valve spool 40 via ball cage 30, spring pin 32 to thereby leftwardly move the valve spool 40 in FIG. 1. The valve spool 40 is rightwardly moved by the output fluid pressure of the chamber 44 fluidically communicated with the outlet port 51 in FIG. 1. In the case that the rightward force for moving the valve spool 40 by the output fluid pressure of the chamber 44 is smaller than the force transmitted from the ball cage 30, the valve spool 40 is leftwardly moved in FIG. 1 and the annular groove 48 is fluidically communicated with the hole 54 and the pressurized fluid of the inlet port 52 is supplied to the outlet port 51 to thereby increase the output fluid pressure of the output port 51. In the case that the rightward force for moving the valve spool 40 by the output fluid pressure of the chamber 44 is larger than the force transmitted from the ball cage 30, the valve spool 40 is rightwardly moved in FIG. 1, and the annular groove 48 is fluidically communicated with the hole 55, the pressurized fluid of the outlet port 51 being discharged into the reservoir, not shown, to thereby decrease the output fluid pressure of the outlet port 51.

The output fluid pressure of the outlet port 51 can be expressed as follows;

$$\frac{\text{the axial component of the centrifugal force acting on the balls 36,37,38}}{\text{the cross-sectional area of the chamber 44}}$$

The axial component of the centrifugal force acting on the balls 36,37,38 is proportional to the centrifugal force acting on the balls 36,37,38 and the moving amount of the valve spool 40 is little and the rotational radius of the balls 36,37,38 are almost the same, so that the centrifugal force acting on the balls 36,37,38 corresponds to the rotational number of the governor valve 11. Accordingly, the output fluid pressure corresponds to the number of rotations of the rotational shaft 20.

Next, referring to FIGS. 4 and 5, the different construction from that shown in FIG. 1 will now be described hereinbelow in detail.

The ball cage 30 is rotatably supported by pins 60,61,62 and is integrally rotated with the body 12 and is slidable against the body 12. The balls 36,37,38 are contacted with the tapered face 39 of the cam 22 fixed to the housing 10 by the centrifugal force and the ball cage 30 is leftwardly moved by the force according to the centrifugal force of the balls 36,37,38 in FIG. 4. The valve spool 40 is contacted with the ball cage 30 and is leftwardly moved by the ball cage 30 in FIG. 4.

The operation according to FIG. 4 is similar to FIG. 1.

The invention has thus been shown and described with reference to specific embodiments. However, it should be noted that the invention is in no way limited to the details of the illustrated structures, but that various changes and modifications may be made without departing from the scope of the appended claims.

What is claimed as new and desired to be secured by Letters Patent of the United States is:

1. A governor valve comprising:
   a housing provided with inlet and outlet ports;
   a rotational shaft provided within said housing;
   a body rotatably supported by said housing for rotation about a given axis therein and operatively connected to said rotational shaft;
   a valve spool slidably disposed along said given axis within said body for controlling the communication between said inlet and outlet ports;
   a ball cage slidably disposed along said given axis within said body and being provided with a plurality of cylindrical portions radially and outwardly extended therefrom;
   a plurality of ball members slidably inserted into said plurality of cylindrical portions of said ball cage; and
   a cam member non-movable axially relative to said body and being provided with a tapered face for receiving a centrifugal force of said plurality of ball members;
   said governor valve being characterized by said valve spool being moved against the output fluid pressure by an axial component generated by contacting said plurality of ball members with said tapered face of cam member.

2. A governor valve as set forth in claim 1, further comprising:
   pin means fixed to said cam member and inserted into said ball cage; and
   spring pin means inserted into said ball cage and said pin means for operatively connecting said ball cage and said pin means.

3. A governor valve as set forth in claim 1, wherein said cam member is fixed to said body.

4. A governor valve as set forth in claim 1, wherein said cam member is fixed to said housing.

* * * * *